J. H. HARRISON, S. E. HALL & J. M. GHOLSON.
BOLL WEEVIL EXTERMINATOR.
APPLICATION FILED DEC. 7, 1915.
1,255,414.
Patented Feb. 5, 1918.
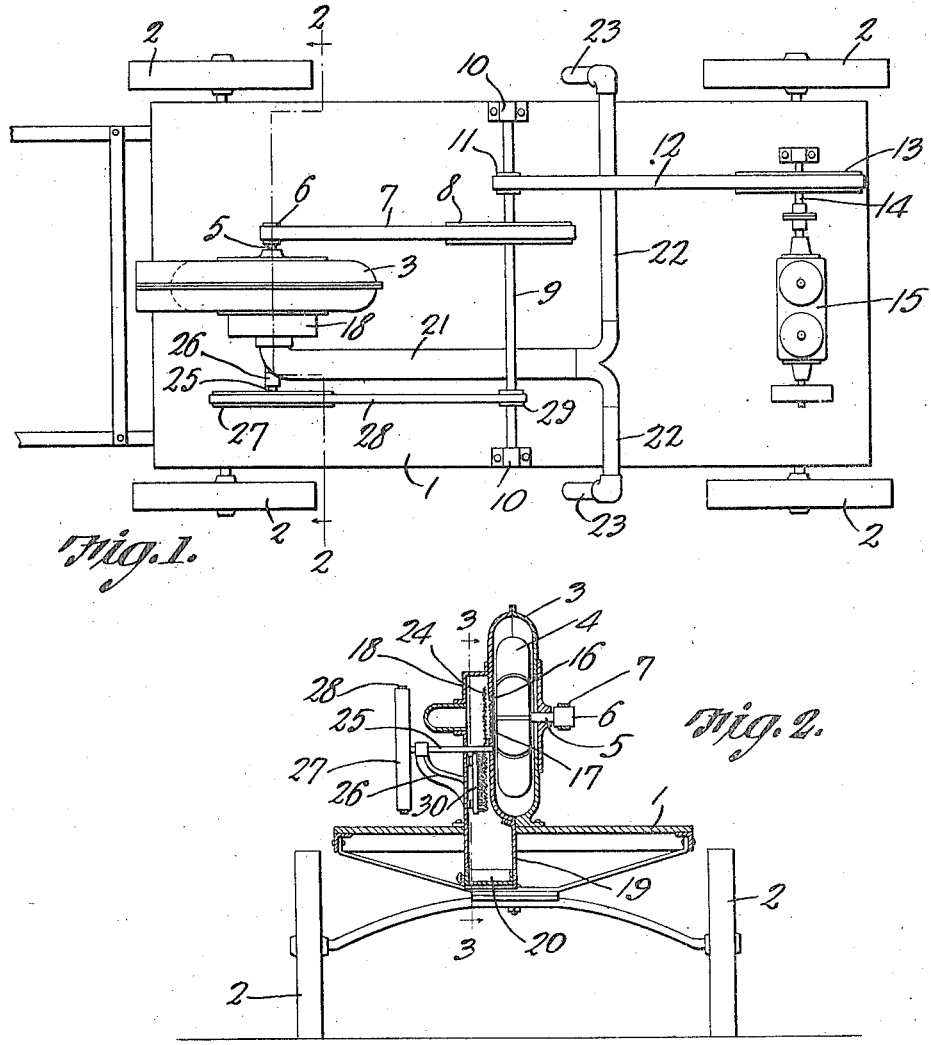
Fig. 1.
Fig. 2.
Fig. 3.
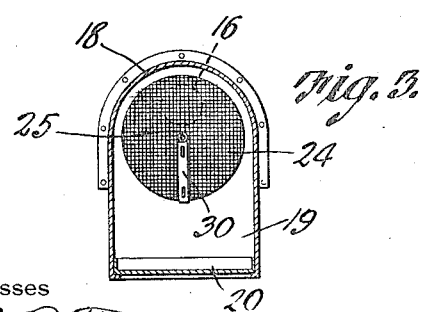
Witnesses
J. H. Harrison
S. E. Hall
J. M. Gholson
Inventors
by
Attorneys

UNITED STATES PATENT OFFICE.

JAMES H. HARRISON, OF RANGER, SAMUEL E. HALL, OF STEPHENS COUNTY, AND JOHN M. GHOLSON, OF RANGER, TEXAS.

BOLL-WEEVIL EXTERMINATOR.

1,255,414.

Specification of Letters Patent.

Patented Feb. 5, 1918.

Application filed December 7, 1915. Serial No. 65,633.

*To all whom it may concern:*

Be it known that we, JAMES H. HARRISON, SAMUEL E. HALL, and JOHN M. GHOLSON, citizens of the United States, said JAMES H. HARRISON residing at Ranger, Eastland county, Texas, said SAMUEL E. HALL residing in Stephens county, Texas, and said JOHN M. GHOLSON residing at Ranger, Eastland county, Texas, have invented a new and useful Boll-Weevil Exterminator, of which the following is a specification.

The present invention appertains to boll weevil and insect exterminators, and aims to provide a novel and improved apparatus for gathering the boll weevil and squares by air suction, and collecting them in order that they can be destroyed, the apparatus also being useful for catching various other insects or pests.

It is the object of the invention to provide a pneumatic apparatus for collecting the weevil and squares by air suction, and having novel means for arresting the insects before they reach the fan, and for delivering them into a confinement or collecting chamber.

It is also within the scope of the invention to provide an appliance of the nature indicated which is comparatively simple and inexpensive in construction, as well as being practical, serviceable and efficient in use.

With the foregoing and other objects in view which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the apparatus.

Fig. 2 is a cross section taken on the line 2—2 of Fig. 1.

Fig. 3 is a sectional detail taken on the line 3—3 of Fig. 2.

The apparatus is preferably wheel-mounted, embodying a suitable vehicle, which in the present case embodies a body or platform 1 mounted upon ground wheels 2, and adapted to be drawn along the rows of cotton plants.

Mounted upon the platform 1 is a centrifugal fan embodying the casing 3 in which is rotatable the fan or rotor 4 carried by a shaft 5 journaled through one side of the casing 3 and having a pulley 6 upon its outer end. The pulley 6 is connected by a belt 7 with a pulley wheel 8 upon a transverse counter shaft 9 journaled in bearings 10 secured upon the platform 1. A pulley 11 upon the shaft 9 is connected by a belt 12 with a pulley wheel 13 secured upon the crank shaft 14 of an engine 15 carried by the platform 1. The fan can be rotated at a high speed when the engine is operated, but it is to be understood that any suitable means may be employed for rotating the fan. For example, the fan can be geared to certain of the ground wheels, so that when the vehicle is drawn over the ground, the fan will be rotated.

The fan casing 3 is provided at that side opposite the pulley 6 with a central inlet opening 16, across which extends a screen 17 secured to said side of the casing, to prevent the insects and other foreign objects from entering the fan casing.

A box or casing 18 is attached to that side of the fan casing 3 having the inlet opening, and said casing or chamber 18 is provided with a depending spout 19 projecting downwardly through the platform 1, and having a drawer 20 within its lower end for catching the insects and squares.

A suction pipe has one end connected to the chamber 18 directly opposite and in alinement with the inlet opening 16 of the fan casing, and the pipe 21 has laterally extending branches 22 provided with depending terminals 23. The terminals 23 are arranged to be moved vertically and to be swung, so that a suction can be extended to the points desired for gathering the insects and squares from the plants and ground. Hose sections can also be used for the terminals 23 if desired.

A wire mesh or reticulated disk 24 is disposed within the chamber 18 adjacent the inlet opening 16, and is mounted upon a short horizontal shaft 25 journaled through the chamber 18 below the suction pipe 21 and also journaled through a bracket 26 attached to the chamber 18. A pulley wheel 27 is secured to the outer end of the shaft 25 and is connected by a belt 28 with a pulley 29 secured upon the counter shaft 9, in order that when the counter shaft is rotated, the disk 24 will be rotated at the proper speed. The upper portion of the disk 24 stands across the inlet opening 16 of the fan casing in the path of the air flowing through the chamber 18 from the pipe 21 to the opening 16 whereby the disk 24 will arrest the insects and other objects drawn into the chamber 18, the air flowing freely through the disk 24 but the apertures thereof being sufficiently small to prevent the insects and foreign objects from passing through the disk 24 to the opening 16.

A vertical brush 30 is secured to the outer wall of the chamber 18 and its bristles project toward and engage the respective side of the disk 24 which is remote from the fan casing.

In operation, when the fan is operated, air will be sucked into the branches 22 and pipe 21, and from said pipe 21 into the fan casing across the chamber 18. The suction will draw the boll weevil and squares into the pipe 21 and chamber 18, and against the disk 24, which rotates about a horizontal axis. The weevil and squares will be held against the disk 24 by the air suction, and since said disk rotates, they will be carried downwardly. The brush 30 will remove the weevil and other particles from the disk 24, so that they drop into the spout 19 and drawer 20. The operation is continuous, so that the weevil and squares can be collected continuously as the apparatus is drawn along the rows of plants. The weevil and squares collected within the chamber 18 can be exterminated in any suitable manner, for example, by means of sulfur fumes, by incinerating them, or the like.

Having thus described the invention, what is claimed as new is:

In an apparatus of the character described, a fan casing and chamber disposed side by side and attached to each other, that side of the casing adjacent to said chamber having an inlet opening, a centrifugal fan rotatable within the casing for sucking air through said opening from the chamber, a suction pipe connected to that side of the chamber opposite the casing in alinement with said inlet opening, a shaft journaled in said chamber below said pipe and opening, a reticulated disk carried by said shaft within said chamber with its upper portion extending across said opening, and a vertical brush mounted within the chamber at that side of the disk opposite said casing, said brush having bristles projecting toward said casing and engaging that side of the disk facing said pipe, said brush extending from said shaft to the margin of the disk.

In testimony that we claim the foregoing as our own, we have hereto affixed our signatures in the presence of two witnesses.

JAMES H. HARRISON.
SAMUEL E. HALL.
JNO. M. GHOLSON.

Witnesses:
JAMES H. MUNN,
E. M. GERDES.

Copies of this patent may be obtained for five cents each, by addressing the "Commissioner of Patents, Washington, D. C."